March 18, 1969     I. E. STEELE     3,433,258

MULTI-PURPOSE UNDERGROUND TANK

Filed Sept. 28, 1965

INVENTOR
IRVIN E. STEELE

BY *LeBlanc & Shur*

ATTORNEYS

March 18, 1969  I. E. STEELE  3,433,258
MULTI-PURPOSE UNDERGROUND TANK

Filed Sept. 28, 1965  Sheet 2 of 2

INVENTOR
IRVIN E. STEELE

BY *LeBlanc & Shur*

ATTORNEYS

# United States Patent Office 3,433,258
Patented Mar. 18, 1969

3,433,258
MULTI-PURPOSE UNDERGROUND TANK
Irvin E. Steele, 1004 Houghton St.,
Connersville, Ind. 47331
Filed Sept. 28, 1965, Ser. No. 490,987
U.S. Cl. 137—590  6 Claims
Int. Cl. E03b 11/14; B01d 17/00

ABSTRACT OF THE DISCLOSURE

The multipurpose tank comprises cylindrical side walls and like arcuate top and bottom walls presenting external convex and concave surfaces. An inlet pipe extends coaxially through the top wall and terminates in a downwardly directed opening spaced slightly above and in axial registry with the apex of the arcuate bottom wall. An outlet pipe extends through the side cylindrical wall adjacent the top wall and has an inwardly extending extension terminating in a disc having a central aperture and a plurality of apertures spaced about the inner end of the extension.

---

The present invention relates to metal tank constructions, and more particularly to a small, inexpensive sheet metal tank which may be used for a wide variety of purposes.

As is well known, few rural communities are serviced by central sewage systems and for the most part household sewage is disposed of through the use of a septic tank system. This is also true in many of the communities in the so-called suburban areas, even those outlying the larger cities in the United States. While septic tanks have taken a wide variety of constructions, they usually simply consist of a large concrete or metal tank having appropriate sewage outlets and inlets and may be provided with one or more so-called sediment traps. The sewage outlet from the septic tank is often supplied to a septic field where the sewage is ultimately absorbed. In some cases the sewage may be fed directly into an appropriate natural subsurface strata having good water absorbing characteristics such as sand, gravel or the like.

However, with the advent of modern technology and the programs involving civil defense against a nuclear war increased interest has been generated in providing suitable and effective means of underground storage for such things as water, liquid fuels, oxygen, gaseous fuels and the like. Many people in rural and suburban areas having constructed underground shelters against nuclear blast and fallout have found that the provision of the shelter alone is not a complete solution to the civil defense problem. In order to exist in a shelter for several days or even weeks in the event of a thermonuclear attack it is necessary that the underground shelter be supplied with uncontaminated water and oxygen for the occupants of the shelter. To this end, various proposals have been made as to ways in which adequate supplies of both drinking water or oxygen or both may be stored underground over long periods so that these life giving fluids may be available to the occupants of a shelter in time of need.

Likewise in rural locations where household and commercial fuels may be supplied in the form of a bottled liquid or gas, and especially the latter, underground storage of the fuel is becoming more common. Space limitations within the rural home may rule out large indoor oil tanks, whereas the provision of outdoor fuel storage tanks in some instances creates an unsightly appearance. Underground fuel storage makes it possible to store the fuel outside of the home and at the same time preserves the attractive appearance of a well landscaped suburban or rural home.

The present invention is directed to the provision of a simple inexpensive tank which may be readily adapted to satisfy any one of the above requirements, that is, the tank may be used in septic systems, may be used for the underground storage of liquid or gas, such as water or oxygen to be supplied to underground fallout shelter or it may be used for the storage of liquid or gaseous fuels.

The tank of the present invention makes it possible for the manufacturer to provide a single inexpensive basic tank construction which may be readily adapted for any of these purposes.

In its preferred embodiment, the novel underground tank of the present invention takes the form of welded sheet metal construction having a central elongated inlet pipe passing through its top and extending downwardly inside of the tank adjacent the tank bottom. A second outlet pipe is preferably welded or otherwise suitably secured to provide a horizontal outlet adjacent the upper portion of the tank. This outlet pipe is provided with a baffle which serves a twofold purpose, namely it prevents the undesired ingress of animals to the interior of the tank when used in a septic system and secondly provides a support arrangement for an auxiliary outlet pipe in a manner more fully described below. An additional important feature of the present invention involves the fact that by directing the fluid entering the tank toward the tank bottom, the contents of the tank are repeatedly mixed such that any solid particles tend to remain disbursed with a lesser tendency to solidify or settle out. In addition to the tank proper, caps are provided for closing off the tank inlets and outlets without the necessity of providing gasket seals and at the same time provide threaded couplings for attaching pipes or flexible tubing so that fluid communication may be readily established between auxiliary equipment and the interior of the tank.

It is, therefore, one of the objects of the invention to provide an improved storage tank construction.

Another object of the invention is to provide a novel storage tank particularly suited for underground use.

Another object of the present invention is to provide an improved septic tank.

Another object of the present invention is to provide a tank which may be readily adapted to a variety of uses, including use as a septic tank, for the storage of oxygen, water, and both liquid and gaseous fuels, as well as for a wide variety of other purposes. The tank may be used as a lavatory in rural areas and when filled with water may be used for fire storage as well as for other emergency purposes.

Another object of the present invention is to provide a storage tank having a baffle pipe coupling making the tank readily adapted to a variety of purposes.

Another object of the present invention is to provide a storage tank and closure cap construction completely eliminating the necessity of sealing gaskets.

These and further objects and advantages of the invention will be more apparent upon reference to the following specification, claims and appended drawings wherein:

Figure 1:
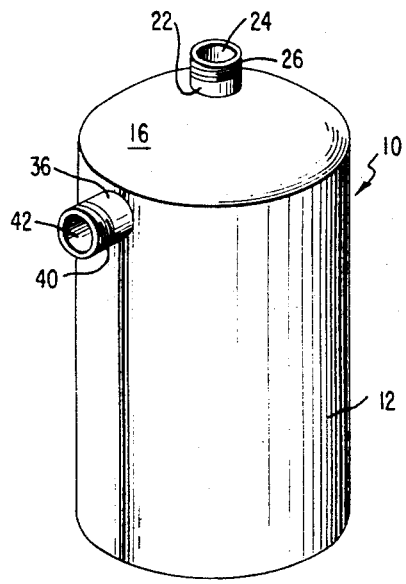
FIG. 1 is a perspective view of a tank constructed in accordance with the present invention.
Figure 2:
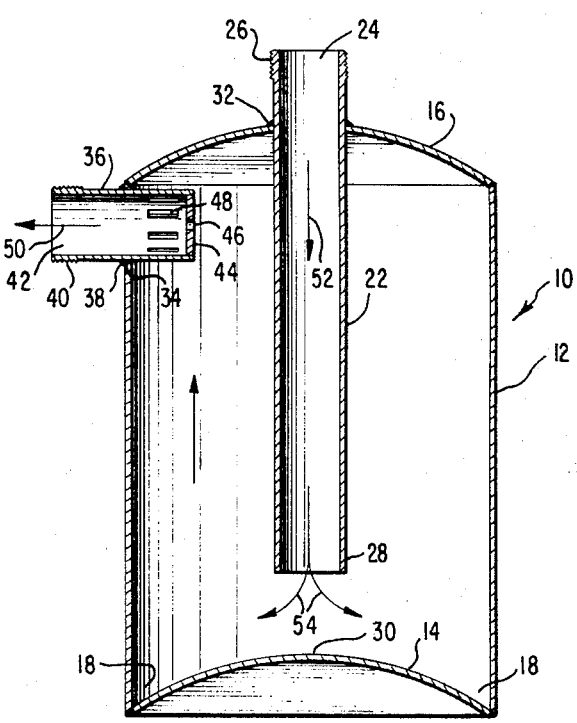
FIG. 2 is a vertical cross section through the tank of FIG. 1.

Referring to the drawings and particularly to FIGS. 1 and 2, the tank of the present invention generally indicated at 10 is preferably of all welded sheet metal construction and comprises a cylindrical side wall 12, a closed inwardly curved bottom 14 and a correspondingly curved cover plate or top 16. The bottom plate 14 and top plate 16 are preferably welded or otherwise tightly secured to the cylinder 12. Bottom 14 is preferably curved as illustrated to present a concave under surface to not only increase the strength of the tank against internal pressures when used with pressurized fluids, but also to provide for the collection of sediment in the annular area 18 adjacent the side wall 12, which is particularly advantageous when the tank is used in a septic system. Top plate 16 is preferably provided with the same overall shape and curvature as bottom plate 14 so that these two plates may be stamped or otherwise suitably manufactured by the same process.

The tank top 16 is provided with a central circular aperture 20 through which is recieved an elongated central inlet pipe 22. This pipe is provided with an inlet end 24 preferably threaded as at 26 and an outlet end 28 terminating above and spaced from the central apex or uppermost curved portion 30 of bottom 14. Pipe 22 is preferably welded to the cover 16 as illustrated at 32.

Figure 3:
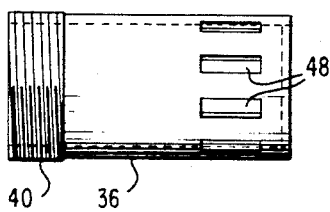
FIG. 3 is a view showing the outlet pipe of the tank of FIGS. 1 and 2.
Figure 4:
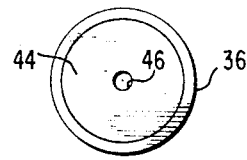
FIG. 4 is an end view of the outlet pipe of FIG. 3.

Side wall 12 of the tank is provided with a circular aperture 34 closely adjacent to tank top 16 through which passes an outlet pipe 36 of approximately the same diameter as inlet pipe 22, more completely illustrated in FIGS. 3 and 4. Pipe 36 is welded to side wall 12 as illustrated at 38 and is preferably provided with external threads 40 adjacent its outlet end 42. The inlet end of the pipe is closed off by a circular baffle plate 44 having a small central aperture 46 passing through the center of the plate. This baffle plate may be welded to the end of the pipe or be formed integral with pipe 36 as desired. In addition, the end pipe 36 adjacent baffle plate 44 is provided with a plurality of elongated slots or apertures, preferably extending completely around the periphery of the pipe, which slots in cooperation with baffle aperture 46 permit fluid egress from the interior of the tank through outlet pipe 36 as indicated by arrow 50 in FIG. 2.

The tank 10 as show in FIGS. 1 through 4 may be used as a septic tank wherein sewage entering through inlet end 24 of pipe 22 passes downwardly as illustrated by the arrow 52 to impinge upon and diverge over the apex 30 of bottom plate 14 as illustrated by the diverging arrows 54. In this way, the incoming sewage (which is mostly in the fluid state) acts to agitate, mix and wash away any sediment or other solid material in the bottom of the tank, moving it into the annular area 18 formed at the junction of bottom plate 14 at side wall 12. This area acts much in the nature of a sediment trap collecting any sediment that may settle to the bottom of the tank. As the tank fills the sewage is acted upon by bacteria in a well-known manner so that the largely fluid material flows outwardly through outlet pipe 36 into the septic tank field or other subsurface gravel or sand layer. Baffle plate 46 in conjunction with the relatively small slots 48 and aperture 46 permits the somewhat purified sewage to readily flow through outlet pipe 36, but at the same time prevents any small animals and particularly rodents from gaining access to the tank interior.

Figure 5:
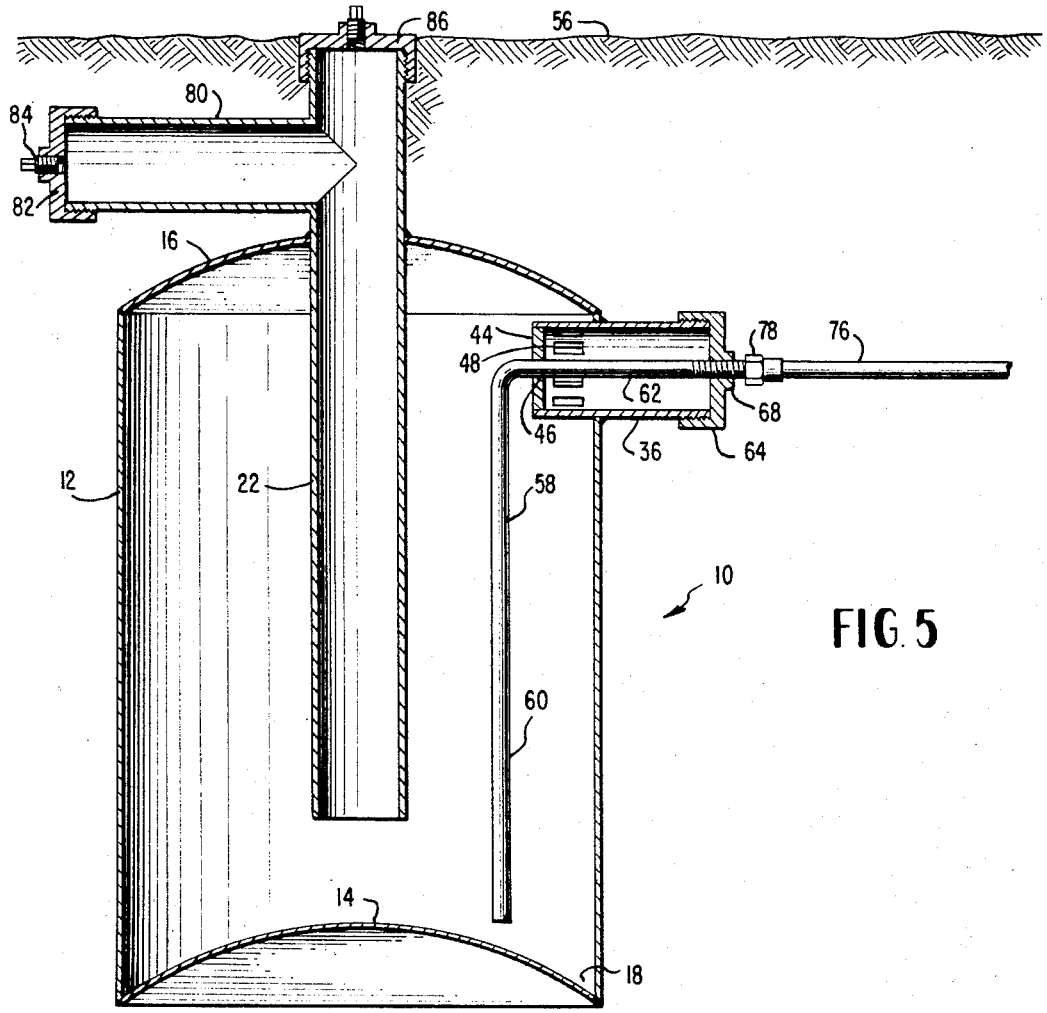
FIG. 5 is a vertical cross section through a modified tank construction in accordance with the present invention showing its use for underground storage.

FIG. 5 is a view showing the same tank 10 used for the underground storage of fluid. The tank again comprises a side wall 12, a bottom 14 and a cover top 16 forming an all welded sheet metal construction. The tank 10 is illustrated as beneath the surface of the earth illusrated at 56. In this embodiment in addition to the outlet pipe 36, the tank is provided with a small generally L-shaped pipe 58 having an elongated downwardly extending arm 60 generally parallel to the inlet pipe 22 and a horizontal arm 62 passing outwardly concentric with pipe 36. Pipe 60 preferably terminates adjacent the bottom plate 14 at a location close to but somewhat lower than the bottom end of inlet pipe 22.

Figure 6:
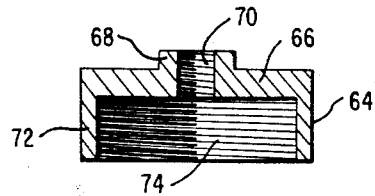
FIG. 6 is a cross section view through one of the end caps of the tank of FIG. 5.
Figure 7:
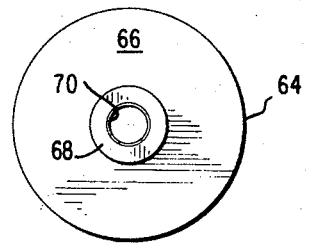
FIG. 7 is an end view of the end cap of FIG. 6.

The arrangement illustrated in FIG. 5 is particularly suited for the underground storage of water such as to provide a drinking water supply for an underground fallout shelter in case of emergencies. To this end the threaded end of outlet pipe 36 is covered by a cap 64 shown in more detail in FIGS. 6 and 7. This cap comprises a flat circular plate 66 provided at its center with an enlarged hollow boss 68 internally threaded as illustrated at 70. This boss may be formed integral with the cap or may be welded thereto. The cap also includes a cylindrical portion 72 integral with plate 66 and this cylindrical portion is similarly internally threaded as indicated at 74.

When the tank 10 is used as an underground source of water, cap 64 is turned on to the threads 42 of outlet pipe 36 and at the same time boss 68 of the cap is threaded onto the small arm 62 of water outlet pipe 58. The water pipe is preferably received through the baffle aperture 46 with a friction fit so that it may be initially adjusted to the desired position to protrude from the opposite side of boss 70. A suitable water line 76 is attached by a conventional connector 78 to the other end of water pipe arm 62. In this way, fluid communication is established between the interior of the tank 10 and water line 76 which may lead beneath the ground 56 to a fallout shelter or other place where an emergency water supply is required.

When used as a septic tank, the outlet pipe 36 is left open and water pipe 58 is capped in a suitable manner such as by applying a solid threaded cap to the outer end of the pipe. An important feature of the invention resides in the fact that by means of this construction the water pipe 58 is tightly supported at two space points, i.e., by the boss 68 threaded over the end of the pipe and by the friction fit through aperture 46 in baffle pipe 44. This provides a stable support for the water pipe while at the same time making it possible to quickly connect it into the system or disconnect it as the case may be. The double support arrangement also assures that the water pipe 58 will at all times be properly positioned within the tank and properly spaced above the bottom plate 14.

In FIG. 5, inlet pipe 22 is illustrated as provided with a horizontal extension 80 formed integral therewith. This extension provides a second inlet for the tank 10 in the event this is desired. In the drawing, extension 80 is illustrated as closed off by an end cap 82 in all respects similar to the cap 64 of FIGS. 6 and 7 and by a suitable plug 84 threaded into the central boss of the cap. A similar cap 86 again in all respects similar to that of FIGS. 6 and 7 closes off the top of pipe 22. As illustrated, the threaded projecting central boss of the cap provides means by which a supply hose may be coupled to the tank to initially supply water thereto. When the tank is filled with water, the cap 86 may be closed off by a plug similar to plug 84 threaded into cap 82.

It is apparent from the above that the present invention provides a simple, inexpensive tank arrangement which may be used for a variety of purposes and which is adapted for use not only as a septic tank in rural and suburban areas, but which may also be used for the underground storage of fluids such as water or combustible fuel materials. In the embodiment illustrated in FIG. 5, the tank 10 is provided with an internal pipe 58 which may or may not be utilized depending upon whether the tank is used in a septic system or whether it is used to supply liquids or gas through a small outlet such as water line 76 illustrated in that figure. A suitable air pump or other pressurizing device may be readily coupled to either of the inlet pipes to pressurize the tank for the removal of the water or other stored liquid.

Important features of the invention include the curved bottom and central bottom feed so as to assure that the contents of the tank are thoroughly mixed as fluid enters through inlet pipe 22 while at the same time the curved bottom of the tank deflects the incoming fluid and drives any sediment over into the annular sediment chamber 18 at the bottom of the tank.

The tank of the present invention involves no moving parts, liquid seals or other complicated and expensive equipment. It may be simply and economically manufactured as a one-item commodity for a variety of uses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A multipurpose storage tank assembly comprising a metal tank having a cylindrical side wall; integral top and bottom walls joined to said side walls, said top and bottom walls being of similar dished configuration whereby said bottom wall presents a concave surface externally of said tank and said top wall presents a convex surface externally of said tank; an inlet pipe passing through the center of said top wall and terinmating adjacent the apex of said bottom wall in an open end, said inlet pipe being otherwise impervious to the passage of fluid through its walls; an outlet pipe passing through said side wall of said tank adjacent said top wall and extending perpendicular to said inlet pipe, said outlet pipe having a plurality of angularly spaced small apertures adjacent its inner end within said tank to prevent the ingress of small animals through said outlet pipe; a solid circular baffle having a central aperture closing off the inner end of said outlet pipe, said inlet and outlet pipes being externally threaded at their outer ends; and an L-shaped pipe of smaller diameter than said inlet and outlet pipes positioned within said tank, said L-shaped pipe having a longer arm extending parallel to and adjacent said inlet pipe, and a shorter, perpendicular arm passing through said aperture in said baffle plate.

2. Apparatus according to claim 1 wherein said L-shaped pipe extends beyond said open end of said inlet pipe and beyond the outer end of said outlet pipe.

3. Apparatus according to claim 2 wherein the outer end of the shorter arm of said L-shaped pipe is externally threaded to receive a coupling member.

4. Apparatus according to claim 3 including a second inlet pipe communicating with said first inlet pipe externally of said tank, and threaded cap means closing off the outer ends of said inlet and outlet pipes.

5. A multi-purpose storage tank assembly comprising a sheet metal tank having a cylindrical side wall; integral top and bottom walls joined to said side walls, said top and bottom walls being of similar dished configuration whereby said bottom wall presents a concave surface externally of said tank and said top wall presents a convex surface externally of said tank; an inlet pipe passing through the center of said top wall and extending coaxially of said cylindrical side wall throughout its full length, said inlet pipe terminating adjacent the apex of said bottom wall in an open end coaxially with the apex of the concave surface of the bottom wall, said inlet pipe being otherwise impervious to the passage of fluid through its walls; an outlet pipe passing through said sidewall of said tank immediately adjacent said top wall and extending a substantial distance within said tank perpendicular to said inlet pipe, said outlet pipe having a plurality of spaced apertures adjacent its inner end within said tank to prevent the ingress of small animals through said outlet pipe, and a solid circular baffle having a central aperture closing off the inner end of said outlet pipe, said inlet and outlet pipes being externally threaded at their outer ends; and a threaded cap for each of said pipes, said cap comprising a flat closure plate and an internally threaded flange for threaded engagement with the external threads of said pipes.

6. An assembly according to claim 5 wherein each said cap includes an internally threaded boss centrally located in said flat plate.

References Cited

UNITED STATES PATENTS

| | | | |
|---|---|---|---|
| 2,698,007 | 12/1954 | Tegler | 122—13 |
| 2,784,291 | 3/1957 | Harney. | |
| 1,987,366 | 1/1935 | Ford | 137—592 X |
| 2,024,579 | 12/1935 | Johnson | 137—592 X |
| 2,673,571 | 3/1954 | Lerom | 137—590 |
| 2,971,532 | 2/1961 | McLaren et al. | 137—592 |

HENRY T. KLINKSIEK, *Primary Examiner.*

U.S. Cl. X.R.

210—532; 122—13